United States Patent [19]

Fischer et al.

[11] Patent Number: 4,644,028
[45] Date of Patent: Feb. 17, 1987

[54] PREPARATION OF AQUEOUS KETONE RESIN OR KETONE/ALDEHYDE RESIN DISPERSIONS, AND PRODUCTION OF SURFACE-COATING BINDERS

[75] Inventors: Kurt Fischer, Ludwigshafen; Harro Petersen, Frankenthal; Hellmuth Kasch, Ludwigshafen; Eckehardt Wistuba, Bad Durkheim, all of Fed. Rep. of Germany

[73] Assignee: BASF Aktiengesellschaft, Fed. Rep. of Germany

[21] Appl. No.: 704,098

[22] Filed: Feb. 22, 1985

[30] Foreign Application Priority Data

Feb. 23, 1984 [DE] Fed. Rep. of Germany ...... 3406474

[51] Int. Cl.⁴ .................... C08K 5/06; C08L 61/02
[52] U.S. Cl. ................... 524/376; 524/501; 524/502; 524/512; 524/513; 525/153
[58] Field of Search ........... 524/500, 512, 502, 542, 524/376, 501, 513; 525/153

[56] References Cited

U.S. PATENT DOCUMENTS

| | | | |
|---|---|---|---|
| 2,529,851 | 11/1950 | Scrutchfield | 524/592 |
| 2,626,934 | 1/1952 | Kesler | 524/592 |
| 2,699,431 | 1/1955 | Harvey | 524/512 |
| 2,859,192 | 11/1958 | Harvey | 525/153 |
| 3,075,935 | 1/1963 | De Shay | 524/512 |
| 3,919,153 | 11/1975 | Fischer | 524/512 |
| 4,009,311 | 2/1977 | Schoenberg | 524/592 |
| 4,033,914 | 7/1977 | Bovier | 524/592 |
| 4,157,318 | 6/1979 | Sadle | 524/592 |

FOREIGN PATENT DOCUMENTS 146498 9/1921 United Kingdom .
170351 10/1921 United Kingdom .

*Primary Examiner*—C. Warren Ivy
*Attorney, Agent, or Firm*—Keil & Weinkauf

[57] ABSTRACT

A process for the preparation of a stable aqeuous ketone resin or ketone/aldehyde resin dispersions and a process for the production of surface coating binders. For this purpose, a melt or a highly concentrated solution of the ketone resin or ketone/aldehyde resin is dispersed in water in the presence of an organic protective colloid. These aqueous resin dispersions can be used, in combination with other film formers, as surface coating binders.

6 Claims, No Drawings

PREPARATION OF AQUEOUS KETONE RESIN OR KETONE/ALDEHYDE RESIN DISPERSIONS, AND PRODUCTION OF SURFACE-COATING BINDERS

The present invention relates to a process for the preparation of stable aqueous ketone resin or ketone-/aldehyde resin dispersions and the production of surface-coating binders by combining these dispersions with various film formers, such as aqueous solutions and/or dispersions of alkyd resins and/or polymers of α,β-ethylenically unsaturated compounds.

Ketone resins and ketone/aldehyde resins have long been known. They are prepared in general by alkali-catalyzed condensation of cycloaliphatic ketones, such as cyclohexanone or its derivatives, if appropriate in combination with aldehydes, in particular formaldehyde. Suitable methods of preparation are described in, for example, German Pat. Nos. 337,993, 357,091, 511,092, 749,836 and 339,107 or German Laid-Open Application DOS No. 2,831,613.

Ketone resins and ketone/aldehyde resins can be used in combination with high molecular weight film formers, eg. cellulose derivatives, chlorinated rubber, copolymers based on vinyl esters, vinyl ethers, vinyl chloride, vinylaromatics, or acrylates, or chemically drying binders, eg. alkyd resins and drying and semi-drying oils, for the production of surface-coatings.

For this purpose, the resins are generally processed together with the solvents and diluents conventionally used in the surface-coating industry, eg. alcohols, ketones, esters and aliphatic and aromatic hydrocarbons, eg. mineral spirit, hexane, toluene, or xylene, and other assistants.

It is an object of the present invention to make ketone resins and ketone/aldehyde resins available for use in other fields too, and at the same time to permit these resins to be processed with less environmental pollution. Moreover, it is intended to improve the gloss, fullness and hardness of the surface-coating films.

We have found that this object is achieved, and that stable aqueous dispersions of finely divided, water-insoluble ketone resins and ketone/aldehyde resins can be prepared, if a melt or highly concentrated solution of the ketone resin or ketone/aldehyde resin is dispersed in water in the presence of an organic protective colloid, with or without the addition of an emulsifier.

The present invention relates to a process for the preparation of stable aqueous dispersions of a ketone resin or ketone/aldehyde resin, wherein a melt or highly concentrated solution of the ketone resin or ketone/aldehyde resin is dispersed in water in the presence of an organic protective colloid, with or without the addition of an emulsifier.

According to the invention, preferably used organic protective colloids are copolymers of vinyl lactams and vinyl esters or carboxyl-containing (meth)acrylate copolymers, some or all of whose carboxyl groups are neutralized.

The present application furthermore relates to a process for the production of surface-coating binders by combining in aqueous ketone resin or ketone/aldehyde resin dispersion prepared according to the invention with other film formers, in particular by combination with aqueous solutions and/or dispersions of alkyd resins and/or polymers of α,β-ethylenically unsaturated compounds.

Regarding the novel process and the components which are suitable for it, the following may be stated specifically: suitable ketone resins for the novel process are the abovementioned condensates of cycloaliphatic ketones, eg. of cyclohexanone or its derivatives, such as methylcyclohexa-none and p-tert.-butylcyclohexanone. These resins can be obtained in a conventional manner by alkali-catalyzed self-condensate of the cycloaliphatic ketones, or mixtures of these, by alkali-catalyzed condensation, and generally have a softening point (according to DIN 53,180) of from 70° to 130° C., preferably from 80° to 100° C.

Suitable ketone/aldehyde resins for the novel process are condensates of ketones and aliphatic aldehydes, preferably condensates of cycloaliphatic ketones eg. cyclohexanone and its derivatives, such as methylcyclohexanone, with aldehydes, preferably formaldehyde or its oligomers, eg. paraformaldehyde. These ketone-/aldehyde resins can be prepared in a conventional manner by condensation in the presence of an alkaline catalyst, and generally have a softening point (according to DIN 53,180) of from 70° to 140° C. preferably from 80° to 110° C.

According to the invention, the ketone resins or the ketone/aldehyde resins, in molten form or in the form of their highly concentrated, about 75 to 95% strength, solutions, are dispersed in water which contains an organic protective colloid and may or may not additionally contain an emulsifier.

Examples of suitable solvents for the resin solutions are alkanols of 1 to 12, preferably 2 to 10, carbon atoms, eg. ethanol, ispropanol, butanols, such as n-butanol and/or isobutanol, 2-ethylhexanol, i-decanol and mixtures of the stated alcohols. Glycol mono-$C_1$–$C_4$-alkyl ethers, eg. butyl ethyleneglycol ether, $C_1$–$C_4$-alkyl-glycol esters, diethylene glycol mono-$C_1$–$C_4$-alkyl ethers, dipropylene glycol mono-$C_1$–$C_4$-alkyl ethers and mixtures of these, aromatics, such as toluene and xylene, and mineral spirit are also suitable.

Suitable organic protective colloids are copolymers of vinyllactams and vinyl esters, and polymer dispersions which are based on acrylate/(meth)acrylic acid and are sufficiently water-soluble or water-swellable.

Copolymers of vinyl esters of carboxylic acids of 1 to 4 carbon atoms, eg. vinyl formate, vinyl acetate, vinyl propionate or vinyl butyrate, with N-vinylamides, eg. vinylpyrrolidone and/or vinylcaprolactam, are particularly useful. Preferred copolymers are copolymers of vinylpyrrolidone with vinyl acetate and/or vinyl propionate, in particular those which contain vinylpyrrolidone and vinyl esters in a molar ratio of 1:1.2 to 1:0.2, eg. copolymers of about 66 parts of N-vinylpyrrolidone and about 34 parts of vinyl propionate, having a K value (according to DIN 51,562) of from 40 to 45, these copolymers being commercially available as, for example, about 30% strength aqueous solutions.

Other suitable organic protective colloids are copolymers of monomers containing olefinically unsaturated hydrophilic groups, such as hydroxyl, carboxyl, amide and/or amino groups, and other copolymerizable olefinically unsaturated organic compounds, eg. esters of acrylic acid or methacrylic acid with alcohols of 1 to 12, preferably 1 to 4, carbon atoms, eg. ethyl (meth)acrylate, propyl (meth)acrylate, butanediol diacrylate, hexanediol diacrylate or diethylaminoethyl acrylate, vinyl esters of carboxylic acids of 1 to 12, preferably 2 to 4, carbon atoms, eg. vinyl acetate and/or vinyl propionate, vinyl ethers of alcohols of 1 to 12, preferably 2 to 4, carbon atoms, eg. vinyl ethyl ether or vinyl isobutyl ether, vinylaromatics, eg. styrene and/or vinyltoluene, and vinylcyclohexene, as well as mixtures of these monomers.

The monomers containing olefinically unsaturated hydrophilic groups, such as hydroxyl, carboxyl, amide and/or amino groups, are present as copolymerized units in the copolymers in amounts such that the copolymers are water-soluble or at least uniformly water-swellable, in the case of the carboxyl-containing copolymers this being so after partial or complete neutralization with an alkali, ammonia or an organic amine.

Examples of suitable hydroxyl-containing copolymerizable olefinically unsaturated monomers are hydroxyalkyl acrylates and hydroxyalkyl methacrylates where alkyl is of 2 to 12 carbon atoms, such as hydroxyethyl (meth)acrylate, hydroxypropyl (meth)acrylate, hydroxybutyl (meth)acrylate or mixtures of these.

Examples of suitable carboxyl-containing copolymerizable olefinically unsaturated monomers are olefinically unsaturated mono- and dicarboxylic acids, such as acrylic acid, methacrylic acid, crotonic acid, maleic acid, maleic half esters of monoalkanols of 1 to 4 carbon atoms, itaconic acid, itaconic half esters and mixtures of these, acrylic acid and methacrylic acid being preferred.

Examples of suitable amide-containing copolymerizable olefinically unsaturated monomers are acrylamide, methacrylamide and their derivatives, such as N-alkyl(meth)acrylamide, N-alkoxymethyl(meth)acrylamide, where alkyl or alkoxy is of 1 to 4 carbon atoms, and/or N-hydroxymethyl(meth)acrylamide.

The organic protective colloids used according to the invention generally have a K value (according to DIN 51,562) in aqueous solution of from 5 to 100, preferably from 10 to 50.

Preferred organic protective colloids of the lastmentioned group are partially or completely neutralized carboxyl-containing copolymers, in particular copolymers of acrylates or methacrylates (some of which can be replaced by styrene) with $\alpha,\beta$-olefinically unsaturated carboxylic acids of 3 to 5 carbon atoms, such as acrylic acid, methacrylic acid, maleic acid or itaconic acid, the carboxylic acid being present as copolymerized units in general in an amount of from 10 to 60, in particular from 25 to 40, % by weight, based on the total weight of the copolymer. Examples of such preferred copolymers are those which are based on ethyl acrylate and acrylic acid and/or methacrylate acid and which have a pH of about 2 as a 25% strength aqueous dispersion before neutralization.

Particularly suitable emulsifiers, which may be used concomitantly, are non-ionic emulsifiers, some of which, ie. not more than 50% by weight, may be replaced with ionic emulsifiers, such as paraffin(olefin)sulfonates or sulfated oxyethylated alkylphenols, in which alkyl is of 8 or 9 carbon atoms and which possess from 5 to 40 ethylene oxide units, or fatty acid triethanolamine esters.

Examples of suitable non-ionic emulsifiers are ethylene oxide adducts or propylene oxide adducts with fatty alcohols, eg. tallow fatty alcohol or $C_{12}$- to $C_{14}$-fatty alcohols. Ethylene oxide adducts containing from 5 to 50, preferably from 8 to 25, ethylene oxide units per fatty alcohol molecule are preferred.

Examples of other non-ionic emulsifiers which can be used concomitantly are ethylene oxide adducts with alkylphenols where alkyl is of 4 to 18 carbon atoms or oxyethylated fatty acids (stearic acid or oleic acid) containing from 5 to 20 ethylene oxide units, and castor oil containing from 5 to 40 ethylene oxide units. Other suitable emulsifiers are partially hydrolyzed polyvinyl acetates or polyvinyl alcohols, water-soluble cellulose derivatives or polyvinylpyrrolidones having a K value of from 25 to 100 (eg. $^R$Luviskol K) and/or hydrolyzed vinyl acetate/vinylpyrrolidone copolymers containing 50% of pyrrolidone and having a K value of from 20 to 40.

To carry out the process according to the invention, the ketone resins or the ketone/aldehyde resins, as a melt or in the form of a highly concentrated solution, are mixed with the water which contains the protective colloid and may or may not furthermore contain an added emulsifier. This can be carried out at from 40° to 100° C. while stirring or supplying energy for agitation by some other means, for example by dispersing with an Ultra-Turax or by circulating via nozzles.

The organic protective colloid is added to the water serving as a dispersing medium, in general in an amount of from 0.1 to 20, preferably from 1 to 5, % by weight, based on the solid resin (ketone resin or ketone/aldehyde resin).

The emulsifier can be added in an amount of from 0 to 20, preferably from 0.1 to 5, % by weight, based on the solid resin.

The novel process can be carried out in a conventional mixing unit, for example in a stirred vessel.

The process according to the invention gives stable aqueous, finely divided (mean particle diameter about 0.1–10 $\mu$m) dispersions which have a solids content of from 30 to 70% by weight and a long shelf life and can be very advantageously processed together with other aqueous film-forming surface-coating binders, for example aqueous alkyd resin solutions or aqueous polymer dispersions.

Suitable aqueous alkyd resin solutions or dispersions are the products conventionally used in industry. It is possible to use, for example, water-dilutable short oil, middle oil or long oil alkyd resins, eg. those based on dehydrated castor oil, which are neutralized with triethanolamine and present as a 55% strength aqueous solution, and middle oil alkyd resins based on drying fatty acids which are modified with isocyanates.

Examples of suitable aqueous polymer dispersions are primary dispersions of copolymers of styrene/butadiene, styrene/$C_1$-$C_{12}$-alkyl (meth)acrylates, $C_1$-$C_{12}$-alkyl (meth)acrylates, vinyl esters, such as vinyl acetate or vinyl propionate, and vinyl esters/(meth)acrylates. These copolymers can contain, as copolymerized units, further monomers possessing OH, COOH and/or $CONH_2$ groups; in general, the last-mentioned monomer can be present as copolymerized units in minor amounts of from 1 to 10, preferably from 2 to 5, % by weight. Such primary dispersions are described in, for example, Houben-Weyl, Methoden der organischen Chemie, volume 14/1 (1961), page 186 et seq., and generally have a solids content of about 30–65, preferably 45–55, % by weight.

Depending on the properties which the surface-coating is required to possess, the ketone resin or ketone/aldehyde resin dispersions prepared according to the invention can be combined with alkyd resin solutions or polymer dispersions in amounts of from 2 to 50, preferably from 5 to 20, % by weight, based on solids. The resulting mixtures, if necessary after the addition of pigments, fillers, dyes, leveling agents (eg. those based on silicone oil), curing catalysts (such as Co octoate, Pb octoate, Mn octoate, Co naphthenate, Pb naphthenate and/or Mn naphthenate) and other assistants, each of which can be added in amounts conventionally employed for these additives, can be applied by a conventional method, for example by brushing on, immersion, spraying, casting or roller-coating with a steel or rubber roller or with a roller covered with a soft absorbent material, onto the substrate to be coated, and can be dried, or baked by heating at from 80° to 150° C. Substrates which can be coated are metals, woodworking materials, paper, plastics and mineral substrates.

The surface coatings produced in this manner possess improved gloss as well as improved hardness and fullness.

In the Examples which follow, parts and percentages are by weight, unless stated otherwise.

EXAMPLE 1

500 parts of a ketone resin based on cyclohexanone and having a softening point of about 80° C. (DIN 58,180) are disssolved in 40 parts of isobutanol at 80° C., whilst stirring. The homogeneous resin solution is cooled to 70° C., and a mixture of 200 parts of a 15% strength aqueous solution of a copolymer of N-vinylpyrrolidone and vinyl propionate in the weight ratio of 2:1, having a K value of 43, eg. $^R$Collacral VL (15% strength), and 50 parts of a highly oxyethylated tallow fatty alcohol, eg. $^R$Emulan OG (20% strength), are added in the course of about 90 minutes. Emulan OG is an emulsifying agent consisting of a highly oxyethylated tallow fatty alcohol having the following characteristics:
- white, waxy microbeads:
- bulk density: ca. 06 g/cm$^3$
- melting point: ca. 50° C.
- dropping point: ca. 52° C.
- acid value (DIN 53401): ca. 0 mg (KOH/g
- saponification value (DIN 53401): ca. 0 mg KOH/g
- pH value (1% in water): ca. 7

When the addition of the protective colloid solution is complete, stirring is continued for 20 minutes at 65° C., after which 230 parts of water are added dropwise in the course of about 90 minutes at from 60° to 65° C. The stirred mixture is then cooled to room temperature. 1015 parts of a stable resin dispersion having a solids content of 52.5% are obtained.

EXAMPLE 2

Combination of the ketone resin dispersion with various film-forming assistants:

A ketone resin dispersion prepared as described in Example 1 forms a film at from 50° to 80° C. Film formation is improved by adding film-forming assistants, such as alkylglycols, eg. butylglycol, alkylglycol esters, eg. butylglycol acetate, aromatic hydrocarbons, eg. xylene, and aliphatic hydrocarbons, eg. mineral spirit, in amounts from 5 to 20%. The addition of butylglycol in an amount of from 5 to 20% permits film formation to take place at room temperature.

Characteristics of the dispersion:
- solids content: 52%
- efflux time (DIN 4 cup, 23° C.): 75 sec
- minimum film-forming temperature: 50° C.

Table 1 shows the film-forming properties, minimum film-forming temperatures, viscosities and film hardness for dispersions containing various film-forming assistants (ethylglycol acetate, xylene, butylglycol or mineral spirit).

TABLE 1

| No. of parts of dispersion/ No. of parts of film-forming assistant | Film formation at Room temp. | 50° C. | 120° C. | Efflux time (DIN 4 cup, 23° C.) | Film hardness (pendulum damping by the Konig method) [sec] | Minimum film-forming temperature (°C.) |
|---|---|---|---|---|---|---|
| Ethyleneglycol acetate | | | | | | |
| | 0 | + | + | 84 | 108 | 19 |
| 9:1 | 0 | + | + | 84 | 108 | 19 |
| 8:2 | 0 | + | + | 108 | 69 | 16 |
| Xylene | | | | | | |
| 9:1 | 0 | + | + | 127 | 69 | 20 |
| 8:2 | 0 | + | + | 206 | 58 | 16 |
| Butylglycol | | | | | | |
| 9:1 | + | + | + | 78 | 50 | 13 |
| 8:2 | + | + | + | 111 | 42 | 11 |
| Mineral spirit | | | | | | |
| 9:1 | 0 | + | + | 120 | 78 | 13 |
| 8:2 | 0 | + | + | 226 | 64 | 13 |

EXAMPLE 3

Combination of a ketone resin dispersion with a water-dilutable, isocyanate-modified fatty acid alkyd resin (e.g. $^R$Alkydal F50W) for the production of an air-drying and oven-drying industrial surface coating:

The alkyd resin is neutralized with ammonia and then mixed with from 10 to 20% of the ketone resin dispersion prepared as described in Example 1, a predispersed pigmented mixture (Mixture I) being combined with a predispersed siccative-containing mixture (Mixture II) in each case. The effect on the film hardness, yellowing and gloss is investigated. The composition (in parts) of the surface coatings and the results obtained with these are summarized in Table 2 ALKYDAL F50W is a water-soluble medium-oil alkyd resin, based on drying fatty acids, modified by isocyanate having the following characteristics:
- concentration: ca. 63 weight% in butylglycol
- oil content/triglyceride: ca. 49%
- phthalic anhydride: ca. 19%
- density/20° C.: ca. 1.11 g/cm$^3$
- iodine index (DIN 53 183): max. 5
- acid value: 42–48 mg KOH/g
- viscosity (20° C.): 4000–4600 mPas.

TABLE 2

| MIXTURE I | | | |
|---|---|---|---|
| Alkyd resin (55% strength in butylglycol), pH 9.5 | 71.8 | 64.2 | 57.1 |
| Ketone resin dispersion from Example 1 | — | 7.4 | 14.7 |
| Leveling agent based on silicone oil | 0.4 | 0.4 | 0.4 |
| Titanium dioxide (rutile) | 94.5 | 94.5 | 94.5 |
| Water | 84 | 84 | 84 |
| MIXTURE II | | | |
| Alkyd resin (55% strength in butylglycol), pH 9.5 | 100.5 | 90.5 | 80.5 |
| Ketone resin dispersion from Example 1 | — | 10.4 | 20.8 |
| ® Soligen Co Pb Mn, 50% strength | 1.9 | 1.75 | 1.5 |
| Water | 126 | 126 | 126 |
| TEST | | | |
| Film hardness (pendulum damping by the Konig method) [sec]: | | | |
| (a) Drying for 1 hour at 50° C. + 2 days at room temperature | 59 | 62 | 65 |
| (b) Drying for 45 minutes at 120° C. + 2 days at room temperature | 81 | 84 | 84 |
| Yellowing (rating 0-6): | | | |
| (a) Drying for 1 hour at 50° C. + 2 days at room temperature | 1 | 1 | 1-2 |
| (b) Drying for 45 minutes at 120° C. + 2 days at room temperature | 2 | 3 | 4 |
| Gloss (Multigloss 60° C. [%]): | | | |
| (a) Drying for 1 hour at 50° C. + 2 days at room temperature | 89 | 94 | 96 |
| (b) Drying for 45 minutes at 120° C. + 2 days at room temperature | 89 | 89 | 94 |
| Water-resistance after 3 hours at room temperature: | Satisfactory | Satisfactory | Satisfactory |

Soligen CoPbMn 50% strength is a curing catalyst which consists of cobalt naphthenate, lead naphthenate and manganese naphthenate in a liquid form having the metal content: Co 0.75 weight Pb 11.0 weight Mn 0.75 weight and the
color: red-violet.

We claim:

1. A process for the preparation of a stable aqueous dispersion of a ketone resin, wherein a melt or an about 75 to 95% strength solution of the ketone resin, which ketone resin is an alkali-catalyzed self-condensate of cyclohexanone or its derivatives, is dispersed in water by agitating the resin-water mixture in the presence of at least one copolymer selected from the group consisting of a copolymer of a vinyl lactam and a vinyl ester, and a carboxyl-containing (meth)acrylate copolymer, some or all of whose carboxyl groups are neutralized, with or without the addition of a non-ionic emulsifier.

2. The process of claim 1, wherein an oxyethylated fatty alcohol containing from 5 to 50 ethylene oxide units per fatty alcohol molecule is added to the dispersion as a non-ionic emulsifier and wherein the ketone resin is a self-condensate of cyclohexanone.

3. A process for the production of a surface-coating binder, wherein an aqueous resin dispersion prepared by the process of claim 1 is combined with an aqueous alkyd resin solution and/or dispersion.

4. A process for the production of a surface-coating binder, wherein an aqueous resin dispersion prepared by the process of claim 1 is combined with an aqueous solution and/or dispersion of polymers of $\alpha,\beta$-ethylenically unsaturated compounds.

5. A surface-coating binder which comprises in combination, an aqueous resin dispersion prepared by the process of claim 1 and an aqueous alkyd resin solution and/or dispersion.

6. A surface-coating binder which comprises in combination, an aqueous resin dispersion prepared by the process of claim 1 and an aqueous solution and/or dispersion of polymers $\alpha,\beta$-ethylenically unsaturated compounds.

* * * * *